United States Patent
Dorsch et al.

(10) Patent No.: US 12,241,461 B2
(45) Date of Patent: Mar. 4, 2025

(54) COMPRESSOR CRANKCASE OIL RECLAMATION SYSTEM

(71) Applicant: Bauer Compressors, Inc., Norfolk, VA (US)

(72) Inventors: Mark E. Dorsch, Chesapeake, VA (US); Shaun D. Quiatchon, Norfolk, VA (US)

(73) Assignee: BAUER COMPRESSORS, INC., Norfolk, VA (US)

( * ) Notice: Subject to any disclaimer, the term of this patent is extended or adjusted under 35 U.S.C. 154(b) by 113 days.

(21) Appl. No.: 18/166,252

(22) Filed: Feb. 8, 2023

(65) Prior Publication Data

US 2024/0068461 A1 Feb. 29, 2024

Related U.S. Application Data

(60) Provisional application No. 63/373,212, filed on Aug. 23, 2022.

(51) Int. Cl.
*F04B 39/02* (2006.01)
*B01D 46/00* (2022.01)
*B01D 46/46* (2006.01)
*F04B 39/16* (2006.01)

(52) U.S. Cl.
CPC ...... *F04B 39/0284* (2013.01); *B01D 46/0031* (2013.01); *B01D 46/46* (2013.01); *F04B 39/0276* (2013.01); *F04B 39/16* (2013.01)

(58) Field of Classification Search
CPC ... F04B 39/0284; F04B 39/0276; F04B 39/16
See application file for complete search history.

(56) References Cited

U.S. PATENT DOCUMENTS

| | | | | |
|---|---|---|---|---|
| 3,777,509 A | * | 12/1973 | Muench | F25B 31/004 62/470 |
| 3,788,776 A | * | 1/1974 | Post | F04B 49/225 417/295 |
| 4,168,638 A | * | 9/1979 | Usui | F16H 61/0021 475/136 |
| 4,213,863 A | * | 7/1980 | Anderson | B01D 17/045 210/DIG. 5 |
| 4,720,024 A | * | 1/1988 | Jongerius | G01F 11/28 222/14 |
| 4,750,456 A | * | 6/1988 | Ladrach | F01M 11/12 123/196 S |
| 4,922,882 A | * | 5/1990 | Topfer | F01M 13/025 123/556 |
| 5,005,615 A | * | 4/1991 | McGarvey | B67D 7/04 141/206 |
| 5,101,936 A | * | 4/1992 | Paredes | F16H 57/0447 184/6.13 |
| 5,318,151 A | * | 6/1994 | Hood | F04C 29/021 184/104.1 |

(Continued)

*Primary Examiner* — Michael A Riegelman
(74) *Attorney, Agent, or Firm* — Peter J. Van Bergen

(57) ABSTRACT

Compressor crankcase oil reclamation methods and systems include a coalescence filter coupled to a pressure relief vent of a compressor crankcase. The filter separates oil from an oil/gas mixture exiting the crankcase. A reservoir receives the oil so-separated. A valve restricts flow of the oil so-separated to a single flow direction running from the reservoir to the crankcase.

15 Claims, 4 Drawing Sheets

(56) References Cited

U.S. PATENT DOCUMENTS

| | | | | |
|---|---|---|---|---|
| 5,565,094 | A * | 10/1996 | Zoch | B01D 17/045 210/167.04 |
| 5,568,842 | A * | 10/1996 | Otani | F01M 1/02 123/196 R |
| 5,634,345 | A * | 6/1997 | Alsenz | F04B 39/0207 62/84 |
| 6,457,462 | B2 * | 10/2002 | Moren | F02M 25/089 123/573 |
| 6,457,564 | B1 * | 10/2002 | Damm | F16H 57/0434 184/104.3 |
| 6,474,953 | B2 * | 11/2002 | Van De Putte | F04C 18/16 184/6.16 |
| 7,007,682 | B2 * | 3/2006 | Takahashi | F02M 35/10222 123/572 |
| 8,292,037 | B2 * | 10/2012 | Kawamura | F01M 1/12 123/196 R |
| 8,439,022 | B2 * | 5/2013 | Ruppel | F02M 25/06 123/573 |
| 8,997,934 | B2 * | 4/2015 | Nielsen | F03D 80/70 184/6.12 |
| 9,181,853 | B2 * | 11/2015 | Leone | F01M 13/028 |
| 9,739,363 | B2 * | 8/2017 | Schweiher | F16H 57/0457 |
| 9,938,868 | B2 * | 4/2018 | Lemke | F01M 13/0011 |
| 9,964,199 | B2 * | 5/2018 | Chen | F16H 57/0405 |
| 10,060,520 | B2 * | 8/2018 | Sterns | F16H 57/027 |
| 10,094,466 | B2 * | 10/2018 | Sterns | F16H 57/02 |
| 11,585,431 | B2 * | 2/2023 | Fleischmann | F16H 57/0436 |
| 2002/0046743 | A1 * | 4/2002 | Moren | F01M 13/023 123/559.1 |
| 2003/0106543 | A1 * | 6/2003 | Gschwindt | F01M 13/022 123/572 |
| 2006/0254566 | A1 * | 11/2006 | Yasuhara | F01M 13/022 123/41.86 |
| 2007/0144155 | A1 * | 6/2007 | Moncelle | F01M 13/021 123/41.86 |
| 2010/0037867 | A1 * | 2/2010 | Kleckler | F02C 7/236 123/510 |
| 2010/0229510 | A1 * | 9/2010 | Heinen | B01D 45/08 55/482 |
| 2014/0158096 | A1 * | 6/2014 | Leone | F02B 29/0468 123/563 |
| 2016/0290193 | A1 * | 10/2016 | Lemke | F01M 13/022 |
| 2020/0165037 | A1 * | 5/2020 | Bayat | B65D 25/385 |
| 2022/0249981 | A1 * | 8/2022 | Amtmann | B01D 19/0042 |
| 2024/0068461 | A1 * | 2/2024 | Dorsch | F04B 39/16 |

* cited by examiner

COMPRESSOR CRANKCASE OIL RECLAMATION SYSTEM

Pursuant to 35 U.S.C. § 119, the benefit of priority from provisional application 63/373,212, with a filing date of Aug. 23, 2022, is claimed for this non-provisional application.

FIELD OF THE DISCLOSURE

The disclosure relates generally to compressors, and more particularly to methods and systems for the reclamation of oil in a gas/oil mist generated by a compressor's blow-by that is then vented from a compressor's crankcase.

BACKGROUND

Gas compressors typically include a crankcase housing a crankshaft, connecting rods, pistons, piston rings, etc., that cooperate when a compressor is running. The moving parts in the crankcase must be continuously lubricated (e.g., using an oil-based lubricant) for proper operation. Gas compressors are generally subject to what is known as "blow-by". Briefly, blow-by occurs when the pressurized gas blows by the piston rings and into a compressor's crankcase during the compression stroke of the pistons. The pressurized gas is released from the crankcase via a vent. Unfortunately, the blow-by gas mixes with some of the crankcase's lubricating oil to form a gas/oil mist that exits the crankcase via its vent. The loss of lubricating oil from the crankcase presents a maintenance issue as oil levels must be frequently checked and replenished to avoid costly compressor repairs or replacement. Concern about oil loss also prevents unattended operation of the system between scheduled maintenance periods thereby increasing operational costs. Still further, the introduction of lubricating oil (contained in the gas/oil mist) into the surrounding environment presents cleanliness and environmental issues. The amount of lubricating oil contained in a blow-by-generated gas/oil mist increases with increasing flow of the blow-by gas due to increasing ring wear over time. All of these problems are exacerbated in the case of multi-stage compressors or booster systems having additional compression stages available to produce blow-by.

SUMMARY

Accordingly, it is an object of the present disclosure to provide methods and systems that reduce maintenance and environmental issues related to the loss of a compressor's crankcase oil due to blow-by.

Another object of the present disclosure is to provide methods and systems that utilize oil normally lost in the compressor's blow-by mist to reduce oil maintenance issues in a gas compressor.

Other objects and advantages of the methods and systems described herein will become more obvious hereinafter in the specification and drawings.

In accordance with methods and systems described herein, a compressor crankcase oil reclamation system includes a coalescence filter coupled to a pressure relief vent of a compressor crankcase. The coalescence filter separates oil from an oil/gas mixture exiting the compressor crankcase via the pressure relief vent. A reservoir, in fluid communication with the coalescence filter, receives the oil so-separated. A valve is disposed between the reservoir and the compressor crankcase for restricting flow of the oil so-separated to a single flow direction running from the reservoir to the compressor crankcase.

BRIEF DESCRIPTION OF THE DRAWINGS

Other objects, features and advantages of the methods and systems described in the present disclosure will become apparent upon reference to the following description of the preferred embodiments and to the drawings, wherein corresponding reference characters indicate corresponding parts throughout the several views of the drawings and wherein.

DETAILED DESCRIPTION

Figure 1:
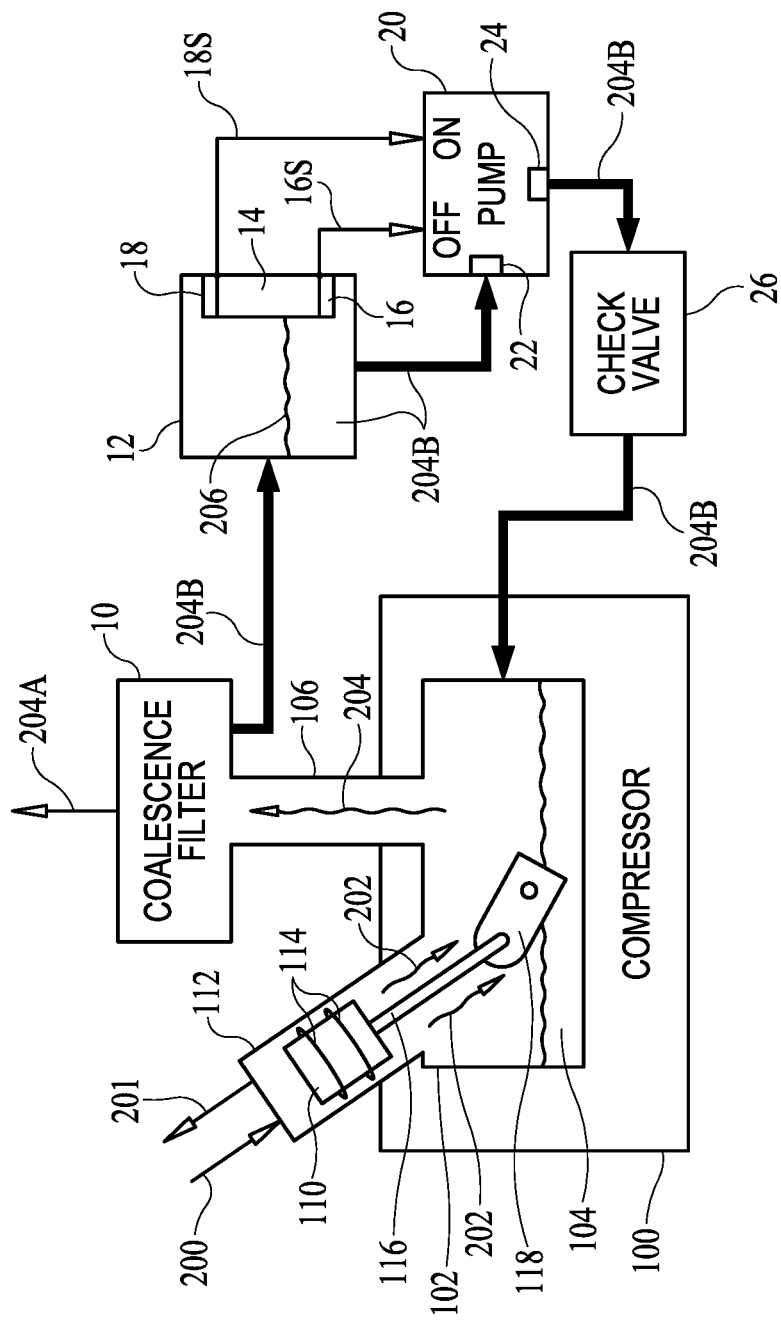
FIG. 1 is a schematic view of a compressor crankcase oil reclamation system in accordance with an embodiment described herein.

Referring now to the drawings and more particularly to FIG. 1, one exemplary embodiment is illustrated of a system for reclaiming compressor lubricating oil (hereinafter "oil") vented from the compressor crankcase due to blow-by. In general, the system of the present disclosure can be used with any type of gas compressor 100 that includes a crankcase 102 housing moving parts and oil 104 therein as is well-understood in the art. In general, the compressor's moving parts include at least one piston 110 disposed within a cylinder 112. One or more piston rings 114 disposed about piston 110 define a seal with cylinder 112. A piston rod 116 couples piston 110 to a crank arm 118 mounted in crankcase 102.

A gas 200, either at atmospheric pressure or some elevated pressure, enters cylinder 112 and is compressed by piston 110 and expelled from cylinder 112 as a compressed gas 201. Some of gas 200 enters crankcase 102 as blow-by indicated by wavy lines 202. Typically, blow-by gas 202 flows past the compressor's piston rings 114 and into crankcase 102. Gas 200 can be a variety of inert gases to include breathable air, nitrogen, helium, etc.

Pressure build-up in crankcase 102 due to blow-by gas 202 is released via a pressure relief vent 106 in crankcase 102. As is known in the art, only inert blow-by gases can be vented to a surrounding atmosphere. Further, blow-by gas can only be vented if adequate ventilation is in place around the compressor system to avoid the danger of asphyxiation of personnel. Prior to venting, some of oil 104 mixes with blow-by gas 202 to form a mist of gas and oil as indicated by wavy arrow 204. Gas/oil mist 204 exits crankcase 102 via vent 106. The amount of oil in gas/oil mist 204 increases with increasing flow of blow-by gas 202.

The methods and systems described herein reclaim the oil portion of gas/oil mist 204 and return it to crankcase 102. The oil reclamation methods and systems described herein may be used/integrated with existing gas compressors or may be included as an integral aspect of new gas compressors without departing from the scope of the present disclosure. Regardless of whether the compressor is an existing or new gas compressor, a coalescence filter 10 is disposed in the path of gas/oil mist 204 to separate the mist into its constituent parts of gas and oil. A variety of coalescing filters are commercially available.

In the embodiment illustrated in FIG. 1, pressure relief vent 106 is placed in fluid communication with coalescence filter 10 such that all of gas/oil mist 204 is introduced into filter 10. The separated gas 204A can be, for example, vented into the surrounding environment when separated gas 204A is inert. The separated oil 204B and its flow path back to crankcase 102 are indicated by a bold line throughout the drawings. Separated oil 204B is first provided to (e.g., via a conduit) a vessel or reservoir 12 that holds separated oil 204B. In some embodiments, the portion of coalescence filter 10 where separated oil 204B collects is located above at least a portion of reservoir 12 so that gravity can provide the motive force for movement of separated oil 204B to reservoir 12.

Mounted in reservoir 12 is a sensor 14 (e.g., a limit switch) that essentially continuously monitors the amount of separated oil 204B contained in reservoir 12. For example, if sensor 14 is a limit switch, it can be configured to have a low-level sensing element 16 positioned at a lower portion of reservoir 12, and have a high-level sensing element 18 positioned at an upper portion of reservoir 12. Low-level sensing element 16 is activated when the surface 206 of separated oil 204B in reservoir 12 falls below sensing element 16. High-level sensing element 18 is activated when the surface 206 of separated oil 204B goes above sensing element 18. In some embodiments, activation of either sensing element 16 or 18 causes them to generate a corresponding electrical signal 16S or 18S that is maintained until the other sensing element is activated.

Separated oil 204B in reservoir 12 is provided to an inlet 22 of a pump 20 via, for example, a conduit (not shown). Low-level electrical signal 16S is applied to pump 20 such that pump 20 is turned "OFF" or deactivated in the presence of signal 16S. High-level electrical signal 18S is applied to pump 20 such that pump 20 is turned "ON" or activated in the presence of signal 18S. More generally, activation of high-level sensing element 18 results in pump 20 being energized, while activation of low-level sensing element 16 results in pump 20 being de-energized. When pump 20 is turned "ON", separated oil 204B in vessel 12 is pumped therefrom and through to pump outlet 24. Pump 20 remains in its "ON" state until low-level electrical signal 16S is received. When pump 20 is "ON", separated oil 204B is fed back (e.g., via a conduit) to crankcase 102 of compressor 100. Disposed between pump outlet 24 and crankcase 102 is a check valve 26 that only permits flow of separated oil 204B from pump 20 into crankcase 102 and assures that gas/oil mist 204 can only exit from crankcase 102 through coalescence filter 10. That is, when pump 20 is "ON", a pressure differential is created across check valve 26 causing it to open for establishment of a flow path there through.

Figure 2:
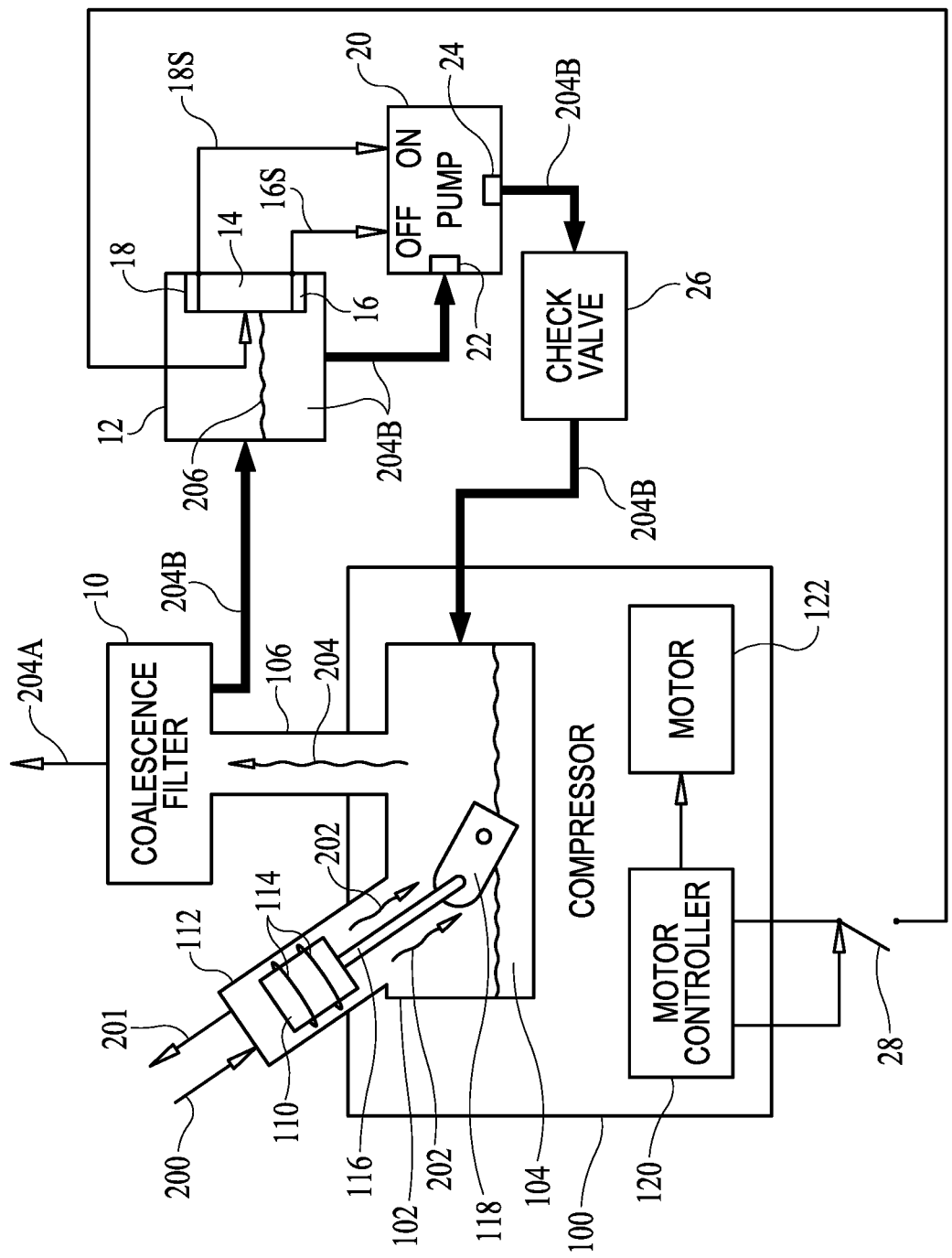
FIG. 2 is a schematic view of a compressor crankcase oil reclamation system in accordance with another embodiment described herein.

In some embodiments, pump 20 is an electric pump that can be configured to be operable only when the compressor's corresponding compressor motor is operating. For example and as shown in FIG. 2, sensor 14 controlling pump 20 can be wired in series with an auxiliary switch 28 whose opening and closing is controlled by the compressor's motor controller 120 that is coupled to the compressor's motor 122 via electrical circuitry (not shown). Briefly, auxiliary switch 28 is configured to close when motor controller 120 is energized to signal the run operation of compressor motor 112. When this occurs, electric power is supplied through sensor 14 to pump 20 thereby enabling potential operation of pump 20, i.e., enabling its operation when signal 18S is also received. When motor controller 120 is de-energized to signal the stopping of compressor motor 122, auxiliary switch 28 is configured to open thereby disabling the potential operation of pump 20 even if signal 18S is received. Electric power routed to pump 20 through sensor 14 can be provided, for example, by control power shared from motor controller 120 when it is energized in ways that would be understood by one of ordinary skill in the art.

The methods and systems described herein may be used for oil reclamation in single-stage compressors or multi-stage compressors. As is known in the art, multi-stage compressors have one or more first stage(s) operating with a gas input at atmospheric pressure whose outputs are supplied to one or more booster compressors operating with a gas input at a pressure that is greater than atmospheric pressure.

Figure 3:
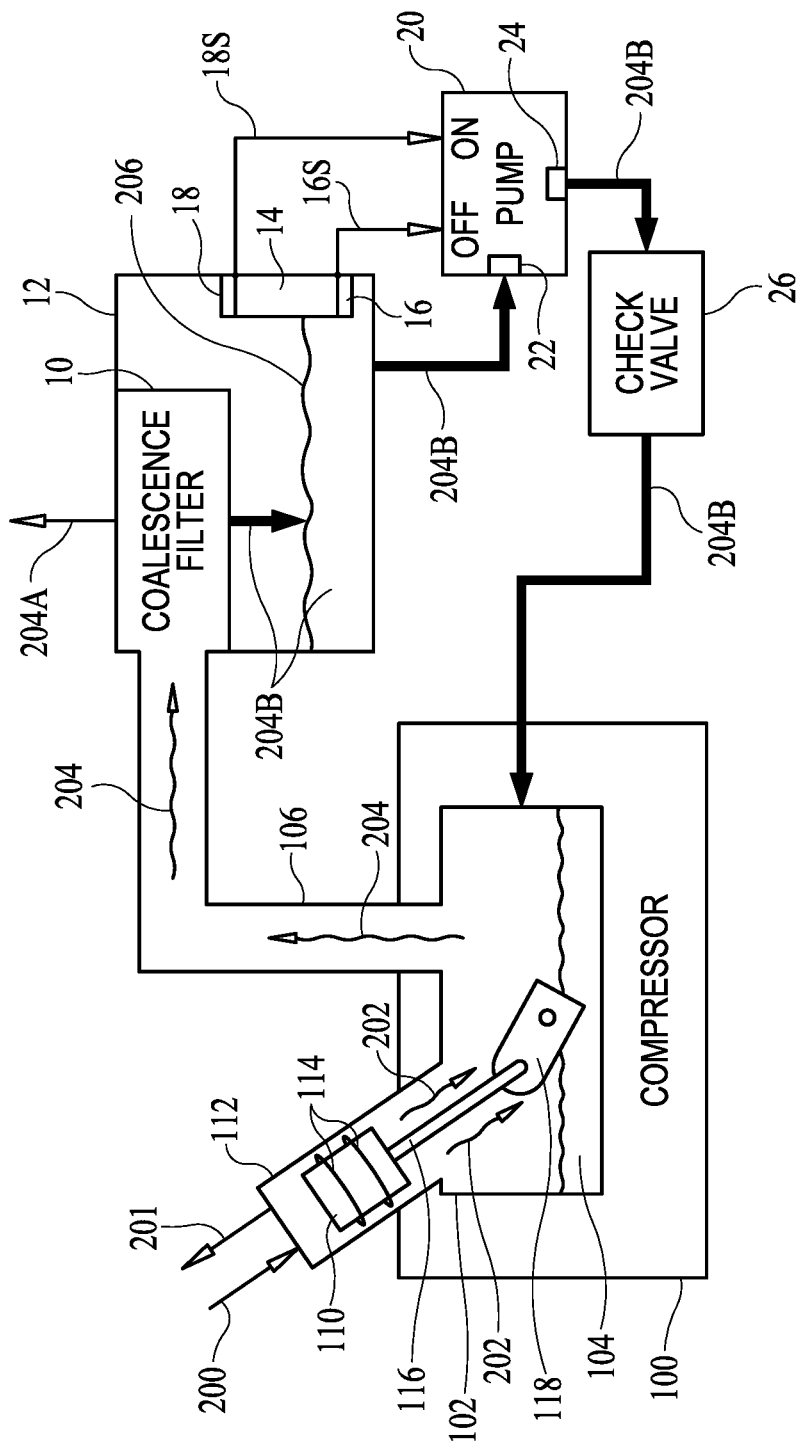
FIG. 3 is a schematic view of a compressor crankcase oil reclamation system having an integrated coalescence filter and reservoir in accordance with another embodiment described herein.

Any of the embodiments described herein could integrate the above-described coalescence filter 10 with reservoir 12. For example, another embodiment is illustrated in FIG. 3 where coalescence filter 10 is disposed in reservoir 12 such that separated oil 204B is initially collected immediately below coalescence filter 10 under the force of gravity.

Figure 4:
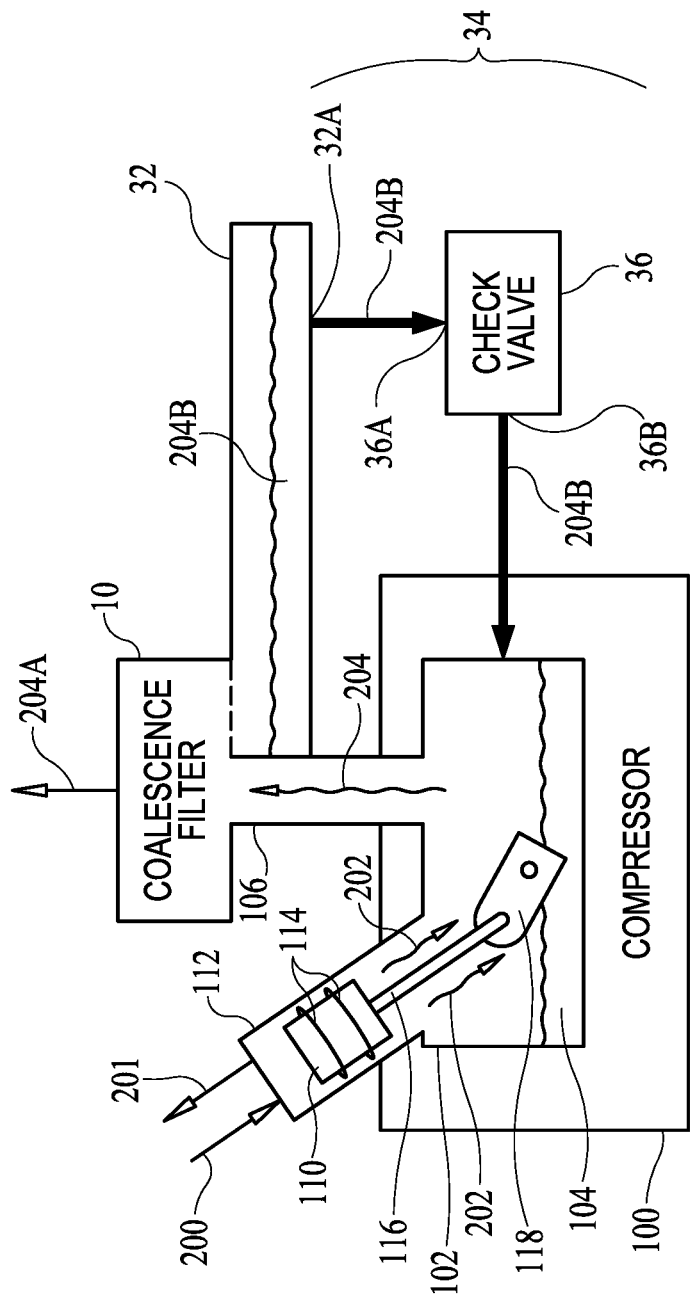
FIG. 4 is a schematic view of a compressor crankcase oil reclamation system for an intermittently operated compressor in accordance with another embodiment described herein.

Some compressor systems are required to run for long and continuous periods of time spanning many hours to days or longer, while other compressor systems are designed and installed in applications that only require the compressor to be operated for periodic or intermittent periods of time spanning minutes to a few hours. In cases where the compressor will only be operated intermittently, blow-by gas oil reclamation may be accomplished without the use of a pump. For example, FIG. 4 illustrates an oil reclamation system in which separated oil 204B is collected in small reservoir 32 that can be immediately and gravitationally beneath coalescence filter 10. Reservoir 32 can be coupled to or integrated with coalescence filter 10. In either case, reservoir 32 is located at a position that is gravitationally above the compressor's crankcase 102. A gravitational flow path 34 is defined between a lowest gravitational position 32A of reservoir 32 and crankcase 102. That is, gravitational forces control fluid movement all along flow path 34. Flow path 34 includes conduits (not shown) carrying separated oil 204B from position 32A to an inlet 36A of a check valve 36, and from an outlet 36B of check valve 36 to crankcase 102. Check valve 36 is configured to be closed (i.e., seated) when the pressure in crankcase 102 ("$P_C$") is greater than the pressure head caused by separated oil 204B at inlet 36A of check valve 36 ("$P_O$"), and open (i.e., unseated) when the pressure $P_C$ is less than the head pressure $P_O$. When compressor 100 is operational, the pressure $P_C$ will be greater than the head pressure $P_O$. However, when compressor is non-operational, the pressure $P_C$ quickly drops to ambient pressure due to venting through vent 106. Once the pressure $P_C$ drops below the head pressure $P_O$, check valve 36 opens to establish a flow path there through such that separated oil 204B is free to flow under the force of gravity back into crankcase 102.

The advantages of the methods and systems described herein are numerous. A gas compressor's crankcase oil that has been traditionally vented and lost in a blow-by-generated gas/oil mist is reclaimed and restored into the crankcase. The system is fully automated for both intermittently-operated and continually-operated compressors thereby requiring no user intervention between scheduled maintenance periods. In tests of embodiments described herein, the time intervals between compressor-crankcase oil maintenance and/or re-fill operations has been substantially increased thereby reducing maintenance concerns and costs, while also eliminating lost-oil clean-up work and environmental concerns.

Although the methods and systems have been described relative to specific embodiments thereof, there are numerous variations and modifications that will be readily apparent to those skilled in the art in light of the above teachings. It is therefore to be understood that, within the scope of the appended claims, the methods and systems may be practiced other than as specifically described.

What is claimed as new and desired to be secured by Letters Patent of the United States is:

1. A compressor crankcase oil reclamation system, comprising:
    a coalescence filter adapted to be coupled to a pressure relief vent of a compressor crankcase for separating oil from an oil/gas mixture exiting the compressor crankcase via the pressure relief vent;
    a reservoir in fluid communication with said coalescence filter for receiving the oil so-separated;
    a sensor coupled to said reservoir and adapted to detect a first level of the oil in said reservoir and a second level of the oil in said reservoir, said sensor generating a first signal when the first level is detected, and said sensor generating a second signal when the second level is detected;
    a pump in fluid communication with said reservoir and coupled to said sensor, wherein said pump is activated to pump the oil from said reservoir when said first signal is generated, and wherein said pump is deactivated when said second signal is generated; and
    a check valve in fluid communication with said pump and adapted to be in fluid communication with the compressor crankcase for restricting flow of the oil from said reservoir to a single flow direction running from said reservoir to the compressor crankcase.

2. The compressor crankcase oil reclamation system of claim 1, wherein said sensor continually generates one of said first signal and said second signal, wherein said first signal is generated until said second level is detected, and wherein said second signal is generated until said first level is detected.

3. The compressor crankcase oil reclamation system of claim 1, wherein at least a portion of said coalescence filter is above at least a portion of said reservoir wherein the oil so-separated by said coalescence filter is adapted to flow to said reservoir under the force of gravity.

4. The compressor crankcase oil reclamation system of claim 1, wherein said coalescence filter is disposed in said reservoir.

5. The compressor crankcase oil reclamation system of claim 1, wherein said sensor comprises a limit switch.

6. A compressor crankcase oil reclamation system, comprising:
    a coalescence filter adapted to be coupled to a pressure relief vent of a compressor's crankcase for separating oil from an oil/gas mixture exiting the crankcase via the pressure relief vent;
    a reservoir in fluid communication with said coalescence filter for receiving the oil so-separated;
    a sensor coupled to said reservoir and adapted to detect a first level of the oil in said reservoir and a second level of the oil in said reservoir, said sensor generating a first signal when the first level is detected, and said sensor generating a second signal when the second level is detected;
    a pump in fluid communication with said reservoir and adapted to be powered by the compressor wherein said pump is only operable when the compressor is operating, said pump being coupled to said sensor, wherein said pump is activated to pump the oil from said reservoir only when said first signal is generated and the compressor is operating, and wherein said pump is deactivated when said second signal is generated; and
    a check valve in fluid communication with said pump and the crankcase for restricting flow of the oil so-separated to a single flow direction running from said pump to the crankcase.

7. The compressor crankcase oil reclamation system of claim 6, wherein said sensor continually generates one of said first signal and said second signal, wherein said first signal is generated until said second level is detected, and wherein said second signal is generated until said first level is detected.

8. The compressor crankcase oil reclamation system of claim 6, wherein at least a portion of said coalescence filter is above at least a portion of said reservoir wherein the oil separated by said coalescence filter is adapted to flow to said reservoir under the force of gravity.

9. The compressor crankcase oil reclamation system of claim 6, wherein said coalescence filter is disposed in said reservoir.

10. The compressor crankcase oil reclamation system of claim 6, wherein said sensor comprises a limit switch.

11. A compressor crankcase oil reclamation system, comprising:
    a coalescence filter adapted to be coupled to a pressure relief vent of a compressor's crankcase for separating oil from an oil/gas mixture exiting the crankcase via the pressure relief vent;
    a reservoir in fluid communication with said coalescence filter for receiving the oil so-separated;
    a sensor coupled to said reservoir and adapted to detect a first level of the oil in said reservoir and a second level of the oil in said reservoir, said sensor generating a first signal when the first level is detected, and said sensor generating a second signal when the second level is detected;
    an electric pump in fluid communication with said reservoir;
    said sensor and said electric pump electrically connected to one another in series, said sensor adapted to receive electric power from the compressor when the compressor is operating wherein the electric power is provided to said electric pump only when the compressor is operating, wherein said electric pump is activated to pump the oil from said reservoir only when said first signal is generated and the compressor is operating, and wherein said electric pump is deactivated when one of said second signal is generated and the compressor is not operating; and
    a check valve in fluid communication with said electric pump and the crankcase for restricting flow of the oil so-separated to a single flow direction running from said electric pump to the crankcase.

12. The compressor crankcase oil reclamation system of claim 11, wherein said sensor continually generates one of said first signal and said second signal, wherein said first signal is generated until said second level is detected, and wherein said second signal is generated until said first level is detected.

13. The compressor crankcase oil reclamation system of claim 11, wherein at least a portion of said coalescence filter is above at least a portion of said reservoir wherein the oil separated by said coalescence filter is adapted to flow to said reservoir under the force of gravity.

14. The compressor crankcase oil reclamation system of claim 11, wherein said coalescence filter is disposed in said reservoir.

15. The compressor crankcase oil reclamation system of claim 11, wherein said sensor comprises a limit switch.

\* \* \* \* \*